United States Patent Office 3,256,221
Patented June 14, 1966

3,256,221
POWDERED POLYVINYL ESTER ADMIXTURES WITH GLYOXAL
James A. Cooper, Wilbraham, Mass., assignor, by mesne assignments, to Monsanto Company, a corporation of Delaware
No Drawing. Continuation of application Ser. No. 774,141, Nov. 17, 1958. This application June 15, 1961, Ser. No. 117,293
3 Claims. (Cl. 260—17)

This is a continuation of application Serial No. 774,141, filed November 17, 1958, now abandoned.

This invention relates to dried polyvinyl ester emulsion powders and more particularly to those powders which can be reconstituted to a stable emulsion simply by mixing with water, which emulsion in turn can be laid down in the form of a film and dried to a substantially water insensitive structure.

It is known in the art to add materials to polyvinyl acetate emulsions for the purpose of increasing the water resistance of films cast therefrom. The method by which such additives have achieved this purpose has been attributed to the action of the additives on the dispersing agent contained in these emulsions so as to minimize its tendency to cause redispersion of the polyvinyl acetate. Various additives have accordingly been added to aqueous emulsions of polyvinyl acetate both during the polymerization process of the vinyl acetate monomer and after the completion of such process and even added after films had been cast from the emulsions for the purpose stated. Many problems which still attend all such additions are solved by the present invention. The incorporation of additives either during or after the completion of the usual polymerization processes has the detrimental effects of increasing the viscosity of the emulsion and/or destroying the emulsion by coagulation, undue settling of the resin particles and other detrimental effects. For this reason the amount of the particular additive has been kept below 1% to minimize such undesired effects. The incorporation of additives into a film which has been cast from the emulsion in order to circumvent the above difficulties, necessitates the addition of another step in the film forming process, hence is undesirable.

The present invention solves the problems attendant to the direct addition of materials to aqueous emulsions of polyvinyl esters, or to films cast therefrom. According to the practice of the present invention it is possible to so combine an additive with the solids of a polyvinyl ester emulsion and subsequently obtain an emulsion from which water resistant films can be cast easily and quickly without adversely affecting the properties of the emulsion.

The principal object of the present invention is to obtain a dried polyvinyl ester emulsion powder containing an additive which powder can be reconstituted to provide an emulsion having the same properties as those from which the powders were manufactured excepting that films cast therefrom will have increased water resistance. It is another object of the present invention to provide a method for obtaining dried polyvinyl ester emulsion powders which can be reconstituted into emulsions and from which, films having highly improved water resistance can be cast. These and other objects of this invention will be apparent from the following examples and subsequent discussions thereon.

The objects of this invention can be accomplished with an admixture of solid glyoxal with dried polyvinyl ester emulsion powders according to the directions hereinafter outlined. Such an admixture per se remains a free-flowing powder which possesses the advantage over liquid emulsions containing glyoxal, of having an unlimited storage life. An admixture of solid glyoxal and a dried polyvinyl ester emulsion powder also has a longer storage life than the dried powder itself, because of reduced tendency of the admixture to cake during storage. Furthermore, if the glyoxal is incorporated into the liquid emulsion and this admixture dried, a problem arises in the reconstitution of the aqueous emulsion by reason of a large viscosity rise which rise takes place during the reconstitution which increases the difficulties of uniform mixing. This viscosity increase does not take place during the reconstitution of the admixtures of the present invention.

The admixtures of the present invention have particular suitability in the preparation of adhesive compositions where it is often desired to dry blend polyvinyl ester emulsion powders with other dry constituents and thereby obtain a mixture from which the liquid adhesive can be obtained merely by the addition of water, which dry mixtures has improved storage stability compared to the liquid adhesive.

Certain advantages are gained with the reconstituted emulsions obtained from the admixtures of the present invention, which are unexpected. The polyvinyl acetate emulsion described in the prior art containing glyoxal additives are stable only under relatively stringent conditions. Such conditions include (a) a maximum glyoxal concentration in the emulsion of only 1%, above which the emulsion coagulates (b) a maximum glyoxal concentration of 3% if the addition is made while the emulsion is at a temperature above 40° C. and (c) a water content in the emulsion of at least 30%. The present inventor has found that admixtures of dry glyoxal and dry polyvinyl ester emulsion powders containing at least 5% and as much as 20% by weight glyoxal can be reconstituted to a stable emulsion at room temperatures. It has further been found that where emulsions containing more than 1% by weight of glyoxal are obtained from the admixtures of the present invention, such emulsions remain stable when the water content is less than 30%. Such results certainly are surprising and should promote greater utilization of polyvinyl ester emulsions generally.

Films cast from the emulsions obtained from the admixtures of the present invention have highly improved properties over films cast from reconstituted emulsions not containing glyoxal. Films cast from the admixture emulsions of polyvinyl acetate are white or colorless, either of which appearance is desired where the emulsions are used to size textile fabrics. The usual glyoxal-containing emulsions are made from additions of 30% aqueous solutions of glyoxal and films cast therefrom have undesirable yellow coloration for the mentioned application.

The type of dried powders which may be used in the practice of the invention are those made in accordance with the teachings of U.S.P. 2,800,463, G. O. Morrison including those prepared by a freeze-drying process as well as those prepared by a spray-drying process. The class of polyvinyl ester compositions which can be benefitted by the practice of the present invention include those dry emulsion powders which can be reconstituted to form both free-filming type emulsions as well as non-free-filming type emulsions. A general limitation which can be placed on suitable types of dried powders that can be benefited by the incorporation of dry glyoxal is that all such powders contain a dispersing and/or emulsifying agent selected from the general class of hydrophilic colloids. The reason for the limitation is that the glyoxal reacts primarily with such hydrophilic colloids in the emulsion thereby insolubilizing them and rendering films cast from the emulsion substantially water-insensitive.

The preferred embodiment of the present invention is illustrated in the following examples but is not limited thereto. Reference in the specification and claims to parts and percentages, unless otherwise specified, refers to parts and percentages by weight.

EXAMPLE 1

A spray-dried emulsion powder was prepared according to the description contained in Example 2, U.S.P. 2,800,463. The dry glyoxal admixture is prepared by adding 5 parts of Glyoxal Neige (dry glyoxal) to 30 parts of the spray-dried powder at room temperatures and thoroughly mixing the constituents with mechanical agitation.

An emulsion was reconstituted from the above admixture by adding 30 parts of water to the composition at room temperature and with additional stirring. Film cast from this emulsion and air-dried at room temperature did not redisperse in water in contrast to films cast from emulsions reconstituted from spray-dried powders not containing the dry glyoxal, which latter films emulsified completely on rubbing with water.

The above emulsion reconstituted from the dry glyoxal admixture still remained stable after a four week storage period.

EXAMPLE 2

A spray-dried emulsion powder was prepared according to the description contained in Example 1, U.S.P. 2,800,463. The dry glyoxal admixture is prepared by adding 6 parts of Glyoxal P.G.S. (dry glyoxal) to 30 parts of the spray-dried powder at room temperature and thoroughly mixing the constituents with mechanical agitation.

An emulsion was reconstituted from the above admixture by adding 30 cc. of water to the composition at room temperature and with additional stirring. Films were cast from the reconstituted emulsion on glass and dried at room temperature for one hour. A drop of water was then placed on the film and rubbed with the finger. The film thus tested was water-resistant as indicated by the absence of any tendency to redisperse, in that the film did not rupture or otherwise disintegrate. On the other hand, films cast from a reconstituted emulsion of the same composition except for the absence of dry glyoxal and tested in the same manner had some redispersion.

EXAMPLE 3

A freeze-dried emulsion powder was prepared according to the description contained in Example 3, U.S.P. 2,800,463. The dry glyoxal admixture was prepared by adding 6 parts of Glyoxal P.G.S. (dry glyoxal) to 30 parts of the freeze-dried powder at room temperature and thoroughly mixing the constituents with mechanical agitation. 25 parts of the above admixture were dispersed in 30 cc. of water at room temperature and run at low speed agitation for 10 minutes to give a redispersion. A control emulsion was also prepared using the same freeze-dried powder but without the glyoxal. Films were then cast on glass from both emulsions and dried for 15 minutes at 50–60° C. The admixture emulsion films were non-redispersible, while the control emulsion films were readily redispersible.

After four weeks storage, both emulsions appeared to be the same in viscosity and settling. Both emulsions contained a water layer on top of the storage containers and the soft settling could be stirred back in by hand. Properties of films formed from the stored emulsions were identical to the originals.

The mechanical wet strength of films cast from the above admixture emulsions is highly improved compared to films obtained from reconstituted emulsions not containing glyoxal. The increased wet strength is believed generally proportional to the amount of glyoxal as is illustrated from the results appearing in Table 1. The test used to measure the comparative wet strengths of the films containing varying amounts of glyoxal was the wet abrasion resistance test generally used in the art performed with a Gardner Straight Line Abrasion machine. The film is wetted with a ½% soap solution and scrubbed with a wet weighted nylon brush. Failure of the film occurs when a section of the film ruptures or otherwise disintegrates due to the scrubbing action. The number of scrubbing strokes which the film withstands before such failure is a measure of the wet strength of the film.

Admixtures containing various amounts of Glyoxal P.G.S. were prepared using samples of the spray-dried emulsion powder prepared in Example 2 above. The admixtures were reconstituted to emulsions containing approximately 55% solids and the films cast therefrom were subsequently air-dried. The results of the test appear in Table 1.

TABLE 1

| Example | Percent Glyoxal P.G.S. | | Wet Abrasion Test Results |
|---|---|---|---|
| | By wt. of polymer powder | In Emulsion | |
| 4 | 0 | 0 | 3 |
| 5 | 1.0 | 0.5 | 32 |
| 6 | 2.0 | 1.0 | 47 |
| 7 | 5.0 | 2.5 | 50 |
| 8 | 10.0 | 5.0 | 154 |
| 9 | 20.0 | 10.0 | 138 |

As can be seen from the test results of Table 1, the film not containing glyoxal exhibited weak scrub resistance which resistance was increased greatly by reason of the additive. Although it appears that there exists a certain optimum concentration of glyoxal additive after which the general water resistance of the film falls off with increasing concentrations of additive, other test results shown in Table 2 below indicate continued improvement in water insensitivity and film properties generally with increased glyoxal additions. The "wet rub" test comprises immersion of the film in water for 1 hour and then rubbing of the film while so immersed. If the water layer turns milky under the rubbing action, re-emulsification of the film is said to occur. The flexibility test comprises stripping an air-dried film from a glass plate and flexing the removed film manually. If the film thus tested can be flexed as distinct from shattering with bending, the film is said to be flexible. Another test indicating the water resistance of films is the "water spot" test. This consists of placing a drop of water on the film and determining the amount of time required to observe a visual effect (such as whitening or blushing) on the film by the water.

TABLE 2

| Example | Wet Rub | Flexibility | Water Spot, sec. |
|---|---|---|---|
| 4 | Re-emulsifies | Brittle | 6 |
| 5 | do | do | 8 |
| 6 | do | do | 25 |
| 7 | do | do | 130 |
| 8 | do | Slightly flexible | 120 |
| 9 | Re-emulsifies only slightly. | Flexible | 120 |

The dried polyvinyl ester emulsion powders which may be used in the practice of this invention are fine free-flowing powders comprising individual powder particles. Each powder particle in turn comprises the combination of a plurality of discrete resin particles of polyvinyl acetate together with the other solids of the emulsion from which the powder was obtained. These solids may be interspersed between and around the resin particles of each powder particle and around the powder particle itself. The class of suitable dried polyvinyl ester emulsion powders for the practice of this invention can be limited to those having as solids interspersed with the polyvinyl ester resin particles, solids selected from the class of hydrophilic colloids having reactive hydroxyl groups. The hydrophilic colloids are film-forming polymeric materials having a substantial number of hydroxyl groups. In addition to the polyvinyl alcohol, hydroxyethyl cellulose and dextrin used in the above examples, other suitable hydrophilic colloids include gum arabic, gum tragacanth, starch, derivatives of these materials and others.

Other solid polyvinyl ester polymer emulsions may be used in the practice of the present invention as substitutes for the homopolymer of vinyl acetate shown in the preceding examples. The reason for the suitability of other polymeric materials is attributable to the function of the glyoxal in insolubilizing the resinous films obtained from the dried powder admixture. The insolubilization reaction takes place primarily between the glyoxal and the normally water sensitive hydrophilic colloid contained in the dried emulsion powder. The substitution of other dry film-forming polyvinyl ester emulsion powders, therefore, all having incorporated therein the same type hydrophilic colloids, is suitable for the practice of this invention. For example, such polymers may be selected from the group consisting of copolymers of vinyl acetate with esters of copolymerizable monoethylenically unsaturated dicarboxylic acids such as dibutyl maleate, diethyl fumarate, dioctyl maleate and the like; copolymers of vinyl acetate with other vinyl esters such as vinyl propionate, vinyl butyrate, vinyl hexoate, vinyl benzoate and the like; copolymers of vinyl acetate with vinyl halides, such as vinyl chloride and vinyl bromide; copolymers of vinyl acetate with lower alkyl esters of acrylic acid such as methyl acrylate, propyl acrylate, butyl acrylate, hexyl acrylate, octyl acrylate and the like; copolymers of vinyl acetate with lower alkyl esters of methacrylic acid such as methyl methacrylate, ethyl methacrylate, propyl methacrylate, butyl methacrylate, hexyl methacrylate, octyl methacrylate and the like; copolymers of vinyl acetate with monoethylenically unsaturated carboxylic acids, such as acrylic acid, methacrylic acid, crotonic acid and the like, etc. Useful dry polyvinyl ester polymers may also be selected from the class of homopolymers of vinyl esters of organic acids, such as vinyl propionate, vinyl butyrate, vinyl hexoate, vinyl benzoate, vinyl stearate and the like, together with copolymers thereof. As illustrative of the practice of the present invention with dry polyvinyl ester emulsion powders other than homopolymers of vinyl acetate, Examples 10 and 11 are given.

EXAMPLE 10

An aqueous emulsion of the copolymer of 75% by weight of the copolymer of vinyl acetate, 25% by weight of the copolymer of dibutyl maleate was prepared according to the method described in sample D, U.S.P. 2,833,737. This emulsion was spray-dried according to the teachings of Morrison, U.S.P. 2,800,463, to yield a free-flowing powder. An admixture is then prepared by adding 5 parts of Glyoxal Neige to 30 parts of the spray-dried powder at room temperature and thoroughly mixing the constituents with mechanical agitation. Upon reconstitution of the emulsion from the above admixture and casting a film therefrom, the air-dried film did not redisperse.

EXAMPLE 11

An aqueous emulsion of polyvinyl butyrate is prepared according to Example 5, U.S.P. 2,227,163 except that polyvinyl alcohol is substituted for the polyethylene oxide emulsifying agent as taught in the reference. The emulsion is spray-dried and then admixed with the dry glyoxal as in Example 10. Films cast from this reconstituted emulsion are non-redispersible.

The dry glyoxal which may be used in the practice of this invention is a white water soluble dry powder form of the dialdehyde, which is essentially colorless if made up into a 30% by weight aqueous solution. The preferred types of dry glyoxal used in the preceding examples, namely, Glyoxal Neige and Glyoxal P.G.S. (both trade names of Bozel-Maletra, Societe Industrielle De Produits Chimiques) are available commercially. The former product is 100% glyoxal while the later is approximately 75% glyoxal, 7% ash and 17.5% water of crystallization.

In addition to the application previously mentioned for which the dried polyvinyl ester admixtures of the present invention have particular suitability, other applications may be especially benefited by the use of such compositions. Emulsions reconstituted from these admixtures have increased utility as textile finishes, surface coatings and other applications. It will also be obvious to the man skilled in the art that variations of the compositions and processes other than those shown herein are possible, hence within the scope of this invention.

What is claimed is:

1. A water redispersible admixture comprising a reconstitutable dry polyvinyl acetate emulsion powder containing interspersed therein a hydrophilic colloid, and 5 to 20% dry glyoxal by weight of the emulsion powder.

2. An admixture as in claim 1 wherein the hydrophilic colloid is taken grom the group consisting of polyvinyl alcohol, hydroxyethyl cellulose, dextrin, gum arabic, gum tragacanth and starch.

3. An admixture as in claim 1 wherein the emulsion powder is prepared from a non-free-filming type emulsion, which admixture is further characterized in that the reconstituted emulsion is substantially as stable as the original emulsion and a film cast from the reconstituted emulsion therefrom and air-dried at room temperature is non-redispersible in water.

References Cited by the Examiner
UNITED STATES PATENTS

| | | | |
|---|---|---|---|
| 2,500,144 | 3/1950 | Beck | 260—17 |
| 2,510,257 | 6/1950 | Robinson | 260—29.6 |
| 2,733,995 | 2/1956 | Robinson | 260—41 |
| 2,800,463 | 7/1957 | Morrison | 260—29.6 |
| 2,809,945 | 10/1957 | Wright et al. | 260—17 |
| 3,104,234 | 9/1963 | Bray | 260—17 |

JOSEPH L. SCHOFER, *Primary Examiner.*

LEON J. BERCOVITZ, *Examiner.*

JAMES A. SEIDLECK, *Assistant Examiner.*